Patented Feb. 13, 1940

2,189,918

UNITED STATES PATENT OFFICE 2,189,918

TREATMENT OF MATERIALS OF NATURAL OR ARTIFICIAL ORIGIN

Robert Wighton Moncrieff, Spondon, near Derby, England, assignor to Celanese Corporation of America, a corporation of Delaware No Drawing. Application May 5, 1937, Serial No. 140,893. In Great Britain June 3, 1936

5 Claims. (Cl. 8—120)

This invention relates to the treatment of filaments, threads, fibres, ribbons, films, fabrics and like materials made of or containing cellulose or regenerated cellulose.

I have found that the affinity of materials of the kind referred to above for cotton dyes can be enhanced by treatment with a water-soluble organic nitrogeneous base in which each atom of carbon directly attached to nitrogen is also directly attached to three other atoms or, when the nitrogen atom is doubly linked to said carbon atom, to two other atoms. Thus a considerable increase in affinity can be imparted to regenerated cellulosic materials by treatment in aqueous baths containing methylamine, ethylene diamine, benzylamine or guanidine.

The base may have a dissociation constant of the order of $10^{-3}$, $10^{-4}$ or $10^{-5}$. Bases of dissociation constant of a lower order than $10^{-6}$ are less useful. With bases of dissociation constant of a higher order, e. g., $10^{-3}$, striking increases of dye affinity can be obtained. With the stronger bases care may be necessary to maintain the desired tenacity in the materials since many of these bases which are capable of increasing the dye affinity of the materials have a pronounced swelling effect on the materials when used in high concentration. Bases of high dissociation constant, for example the substituted quaternary ammonium compounds possess this swelling effect to a high degree and are many of them capable of dissolving cellulose. A useful degree of increase in dye affinity can, however, be obtained by suitable choice of concentration and temperature without substantial shrinkage even when the materials are free to shrink. Particularly valuable results have been obtained by the use of ethylene diamine which has a dissociation constant of the order of $10^{-4}$. Using this substance in aqueous solution it has been found possible to increase the dye affinity of regenerated cellulosic threads and other cellulosic materials to a considerable extent without any substantial degree of shrinkage and without adversely affecting the tenacity or other valuable properties of the materials.

The base may contain one or more nitrogenous basic groups which may be primary, secondary or tertiary. Among aliphatic and heterocyclic diamines those in which the two amino groups are separated by 2 to 4 carbon atoms as in ethylene diamine, piperazine and their substitution products are the most useful. In general primary or secondary bases give more pronounced effects than tertiary bases, and quaternary bases also give pronounced effects.

Apart from ethylene diamine which is of outstanding importance in the process of the present invention, the following bases may be mentioned: monomethylamine, dimethylamine, tetra-methyl ammonium hydroxide, monoethylamine, diethylamine, tetra-ethyl ammonium hydroxide, monopropylamine, dipropylamine, isopropylamine, the amylamines, particularly normal amylamine, the butylamines, particularly normal butylamine and isobutylamine, the benzylamines, particularly mono- and dibenzylamine and the quaternary benzylamine compounds, cyclohexylamine, piperidine, piperazine, guanidine and derivatives thereof, e. g., biguanide and alkyl guanidines, propylene diamine, mono- and dimethyl propylene diamines, mono- and dimethyl-ethylene diamines, and the alkylolamines, particularly monoethanolamine.

The base may be applied to the materials in any suitable way. When, for example, a volatile base is used it may be applied in vapour form, preferably to the wetted materials. The application of the base in solution in non-hydroxy organic liquids, for example hydrotropic liquids such as acetone, diacetone alcohol, dioxane and methylene ethylene ether, or non-hydrotropic liquids such as benzene and other hydrocarbons and chlorinated aliphatic hydrocarbons, or even in the liquid condition without a diluent, is not excluded. It is preferable, however, to apply the base in solution in a liquid containing for example an alcohol such as methyl, ethyl, propyl, isopropyl or benzyl alcohol, or better still in aqueous solution. The materials may, for example, be immersed in an aqueous bath containing the base for a time depending on the temperature and the activity of the base used and then removed and preferably washed before dyeing. Threads and like materials may be treated in hank form or on foraminous bobbins or other suitable package carriers. Fabrics may be treated, for example, on a winch, jig or other suitable machine. If desired the treatment, whether of fabric or of yarns or films, may be continuous, the material being slowly passed through the treating bath; or the material may be passed through a bath to impregnate it with the treating agent and thereafter batched in contact with said agent, preferably after removing excess, for example by means of nip rolls or centrifuges, until the desired effect is produced. The treatment may be effected under tension which may be sufficient only to prevent shrinkage or may be sufficient to stretch the materials; or shrinkage may be allowed or facilitated, for example, in the case of travelling yarns by progressively reducing the speed of travel along the path of the material.

The concentration of the bath will depend upon the nature of the base used, the temperature and the sensitivity of the materials to the base. For any particular base it is a matter of simple experiment to determine the best concentration and temperature. In the case of ethylene-diamine concentrations of between 55 and 65% are suitable at temperatures between 20 and 60° C. With stronger bases of greater swelling action, for example the substituted quaternary ammonium bases, lower concentrations and/or lower temperatures may be used and with weaker bases even higher temperatures and concentrations may be used.

The treatment may be carried out at any suitable pressure, for instance at atmospheric pressure or at superatmospheric pressure ranging from a few pounds per square inch up to 5 or 10 atmospheres or more. Working under pressure is of particular advantage when volatile bases are employed and/or where it is desired to work at high temperatures.

The most important application of the invention is in the treatment of textile materials having a basis of regenerated cellulose and particularly materials formed by the complete saponification of threads, fabrics and like materials having a basis of cellulose acetate. The materials may be formed by the saponification of materials containing other organic esters of cellulose, for example cellulose formate, propionate, butyrate, acetate-propionate, acetate-butyrate, or they may be formed by denitration of nitrocellulose materials. Again, the materials may have been produced by the viscose or cuprammonium processes. The threads and like materials treated may be of normal or even low tenacity or may have a high tenacity, e. g., 2, 2.5, 3, 4 or more grams per denier, resulting at least in part from a stretching operation carried out at some stage of their manufacture. For example, the threads treated may have been made by saponifying a cellulose acetate thread which has been stretched to several times its original length under the action of organic or inorganic swelling agents, or steam or hot water, with or without subsequent shrinking. The saponification may have been effected by any suitable means, for example by treatment with caustic soda or other mineral base or with an alkaline salt of an alkali metal, for example sodium carbonate or sodium silicate, or with an organic base such as the bases referred to herein, or in the case of threads made from an ester of cellulose or from viscose or cuprammonium solutions of cellulose, stretching may have been effected during spinning. The process of the invention is particularly useful in the treatment of materials of high tenacity and may impart to them a high affinity for some cotton dyes for which they have substantially no affinity before treatment.

The following example illustrates the invention:—

*Example*

Regenerated cellulose artificial silk yarn produced by the complete saponification of cellulose acetate artificial yarn of high tenacity is immersed in hank form in an aqueous bath containing about 60% of ethylene diamine for 10 to 15 minutes at 20 to 60° C.

The material is then removed from the bath, washed and dyed with 10% Chlorazol Black BH and 60% common salt on the weight of the yarn at a temperature of 85° C. for 45 minutes. Substantially no shrinkage occurs during the treatment.

In an exactly similar way cotton and viscose artificial silk can be treated. Instead of ethylene diamine other bases may be employed, for example guanidine, tetra-methyl ammonium hydroxide or other of the bases mentioned above.

The process of the invention is of particular utility in the case of materials formed from continuous filaments, but it may also be applied to materials formed from discontinuous fibres whether said materials or fibres are of vegetable or artificial origin. The threads treated may be of low, normal or high twist, for example crêpe twist. The invention includes the treatment of ribbons and films of regenerated cellulose formed by processes analogous to those described for threads above.

Having described my invention that I desire to secure by Letters Patent is:

1. Process for the production of improved artificial materials, which comprises treating materials produced by the complete saponification of materials comprising filaments, fibres, ribbons or films having a basis of an organic ester of cellulose and a tenacity in excess of 2.5 grams per denier with a water-soluble organic nitrogenous base in which each atom of carbon directly attached by a single link to nitrogen is also directly attached to three other atoms and each atom of nitrogen directly attached by a double linkage to nitrogen is also attached to two other atoms, until the affinity of the materials for cotton dyes is increased.

2. Process for the production of improved artificial materials, which comprises treating materials produced by the complete saponification of materials comprising filaments, fibres, ribbons or films having a basis of an organic ester of cellulose and a tenacity in excess of 2.5 grams per denier with an aqueous solution of a water-soluble organic nitrogenous base in which each atom of carbon directly attached by a single link to nitrogen is also directly attached to three other atoms and each atom of nitrogen directly attached by a double linkage to nitrogen is also attached to two other atoms, until the affinity of the materials for cotton dyes is increased.

3. Process for the production of improved artificial materials, which comprises treating materials produced by the complete saponification of materials comprising filaments, fibres, ribbons or films having a basis of an organic ester of cellulose and a tenacity in excess of 2.5 grams per denier with an aqueous solution of monobenzylamine until the affinity of the materials for cotton dyes is increased.

4. Process for the production of improved artificial materials, which comprises treating materials produced by the complete saponification of materials comprising filaments, fibres, ribbons or films having a basis of an organic ester of cellulose and a tenactiy in excess of 2.5 grams per denier with an aqueous solution of ethylene diamine until the affinity of the materials for cotton dyes is increased.

5. Process for the production of improved artificial materials, which comprises treating materials produced by the complete saponification of materials comprising filaments, fibres, ribbons or films having a basis of an organic ester of cellulose and a tenacity in excess of 2.5 grams per denier with a 55–65% aqueous solution of ethylene diamine at a temperature of 20–60° C. until the affinity of the materials for cotton dyes is increased.

ROBERT WIGHTON MONCRIEFF.